(12) United States Patent  
Kim (10) Patent No.: US 11,499,518 B2
(45) Date of Patent: Nov. 15, 2022

(54) POWER GENERATION APPARATUS

(71) Applicant: Jin Young Kim, Gyeongsangbuk-do (KR)

(72) Inventor: Jin Young Kim, Gyeongsangbuk-do (KR)

(*) Notice: Subject to any disclaimer, the term of this patent is extended or adjusted under 35 U.S.C. 154(b) by 0 days.

(21) Appl. No.: 17/418,923

(22) PCT Filed: Jan. 3, 2020

(86) PCT No.: PCT/KR2020/000076
§ 371 (c)(1),
(2) Date: Jun. 28, 2021

(87) PCT Pub. No.: WO2020/145574
PCT Pub. Date: Jul. 16, 2020

(65) Prior Publication Data
US 2022/0065214 A1    Mar. 3, 2022

(30) Foreign Application Priority Data
Jan. 7, 2019   (KR) ........................ 10-2019-0001494

(51) Int. Cl.
*F03B 13/06*   (2006.01)
*F03B 17/06*   (2006.01)

(52) U.S. Cl.
CPC .............. *F03B 13/06* (2013.01); *F03B 17/06* (2013.01); *F05B 2220/706* (2013.01)

(58) Field of Classification Search
CPC ..... F03B 13/06; F03B 17/06; F05B 2220/706
See application file for complete search history.

(56) References Cited

U.S. PATENT DOCUMENTS 8,127,542 B1 * 3/2012 Dolcimascolo ....... F03B 17/005
60/398

FOREIGN PATENT DOCUMENTS

KR    10-1922839 B1   11/2018

* cited by examiner

*Primary Examiner* — Viet P Nguyen
(74) *Attorney, Agent, or Firm* — KORUS Patent, LLC; Seong Il Jeong (57) ABSTRACT

The present invention relates to a power generation apparatus, and more particularly to a power generation apparatus that generates power by dropping collected water. A power generation apparatus according to an embodiment of the present invention includes: a chamber having an accommodation space for accommodating water, and configured to accommodate water introduced through an intake pipe disposed on the bottom surface thereof; a pressure pump configured to discharge the air of the accommodation space out of the chamber through a discharge pipe provided on the ceiling surface of the chamber by generating pressure; a spray unit provided on the side surface of the chamber, and configured to spray water, introduced by the pressure pump and accommodated in the accommodation space, out of the chamber; and a power generation unit configured to generate power using the pressure of water sprayed by the spray unit.

8 Claims, 9 Drawing Sheets

POWER GENERATION APPARATUS

TECHNICAL FIELD

The present invention relates to a power generation apparatus, and more particularly to a power generation apparatus that generates power by dropping collected water.

BACKGROUND ART

Energy resources and the production of energy mainly depend on natural resources or energy resources such as given passive natural power or nuclear power. Accordingly, not only the depletion and shortage of energy resources but also dangerous environmental pollution and social problems are caused.

It is difficult to solve the depletion and shortage of energy resources, the environmental pollution, and the social problems by using limited natural resources such as coal and oil, passive natural power such as hydropower, wind power, and solar power, or dangerous energy resources such as nuclear power.

There are many examples including the method of efficiently utilizing force using the principle of leverage in addition to the above-described method using resources.

In the generation of force using the principle of leverage, even when an object having the same weight is placed on a lever, force is balanced, increases, or decreases depending on the spatial distance from a fulcrum. The spatial power attributable to the spatial distance of the lever is not passively given by nature or by explosive physical force, but is an enough spatial, technological energy generated by a spatial expansion method performed by adjusting a spatial structure or spatial distance, which may be viewed as a source of future energy desired by humankind.

Therefore, in order to solve the above various energy problems, there is a demand for the advent of an invention that is capable of generating enough eco-friendly alternative energy as electric power by technically storing the power, generated by the lever, in a space using the principle of leverage in a high-dimensional manner.

DISCLOSURE

Technical Problem

An object of the present invention is to provide a power generation apparatus.

The objects of the present invention are not limited to the object mentioned above, and other objects that are not mentioned will be clearly understood by those of ordinary skill in the art from the following description.

Technical Solution

In order to accomplish the above object, according to an embodiment of the present invention, there is provided a power generation apparatus including: a chamber having an accommodation space for accommodating water, and configured to accommodate water introduced through an intake pipe disposed on the bottom surface thereof; a pressure pump configured to discharge the air of the accommodation space out of the chamber through a discharge pipe provided on the ceiling surface of the chamber by generating pressure; a spray unit provided on the side surface of the chamber, and configured to spray water, introduced by the pressure pump and accommodated in the accommodation space, out of the chamber; and a power generation unit configured to generate power using the pressure of water sprayed by the spray unit.

The chamber may have a shape long in a direction perpendicular to the ground or a wide shape parallel to the ground; the sectional area of the ceiling surface may be formed to be larger than the sectional area of the discharge pipe; and the sectional area of the bottom surface may be formed to be larger than the sectional area of the intake pipe.

The power generation apparatus may further include: an inlet pipe provided on the ceiling surface of the chamber, and configured to provide a path for external air introduced into the accommodation space; an inlet valve configured to selectively open and close the inlet pipe; and an intake valve configured to selectively open and close the intake pipe.

The power generation apparatus may further include a control device configured to control the pressure pump, the spray unit, the inlet valve, and the intake valve.

The power generation unit may include: a rotation part configured to be rotated by the force of water sprayed by the spray unit; and a power generation part configured to convert the rotational force of the rotation part into electric power.

The spray unit may be provided above the rotation part; and the rotation part may be rotated by the force of water falling from the spray unit.

The accommodation space may include: an upper space formed in the upper side of the accommodation space based on the height of the spray unit; and a lower space formed in the lower side of the accommodation space based on the height of the spray unit; the upper space may include a space corresponding to the height of the spray unit; the lower space may be connected to the intake pipe; and the volume of the upper space per unit height may be formed to be larger than the volume of the lower space per unit height.

The lower space may have a sectional area increasing in an upward direction from the intake pipe, or may have the same sectional area as the intake pipe.

Details of other embodiments are included in the detailed description and the drawings.

BEST MODE

Preferred embodiments of the present invention will be described in detail below with reference to the accompanying drawings. The advantages and features of the present invention and methods of achieving them will become apparent with reference to the embodiments to be described below in detail in conjunction with the accompanying drawings. However, the present invention is not limited to the embodiments to be disclosed below, but may be implemented in various different forms. These embodiments are provided merely to make the disclosure of the present invention complete and to fully convey the scope of the invention to those of ordinary skill in the art to which the present invention pertains. The invention is only defined by the scope of the claims. The same reference numerals refer to the same elements throughout the specification.

Unless otherwise defined, all terms (including technical and scientific terms) used herein may be used based on meanings that can be commonly understood by those of ordinary skill in the art to which the present invention pertains. In addition, terms defined in commonly used dictionaries are not interpreted ideally or excessively unless clearly defined specifically.

Figure 1:
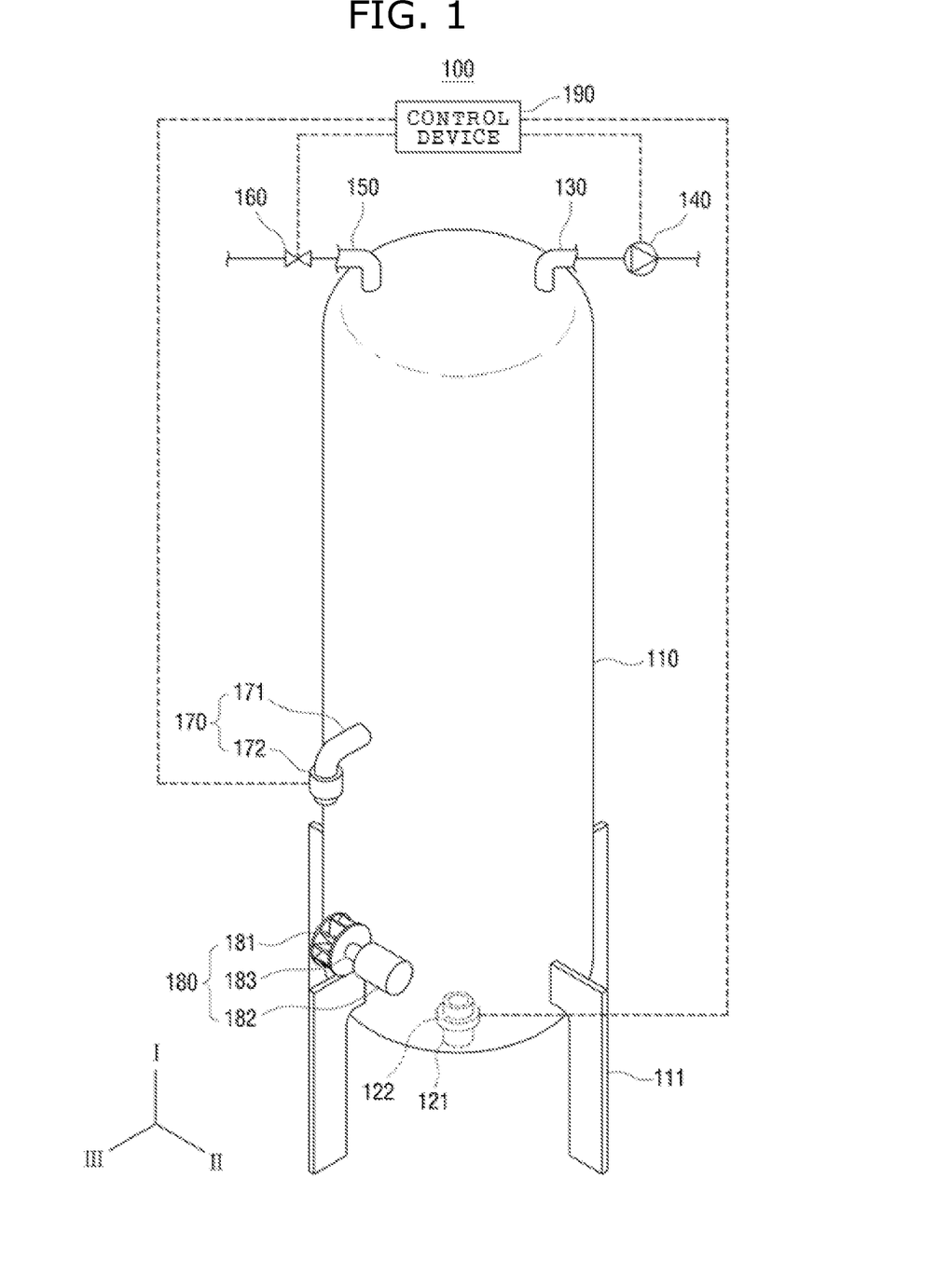
FIGS. 1 and 2 are views showing a power generation apparatus according to an embodiment of the present invention.
Figure 2:
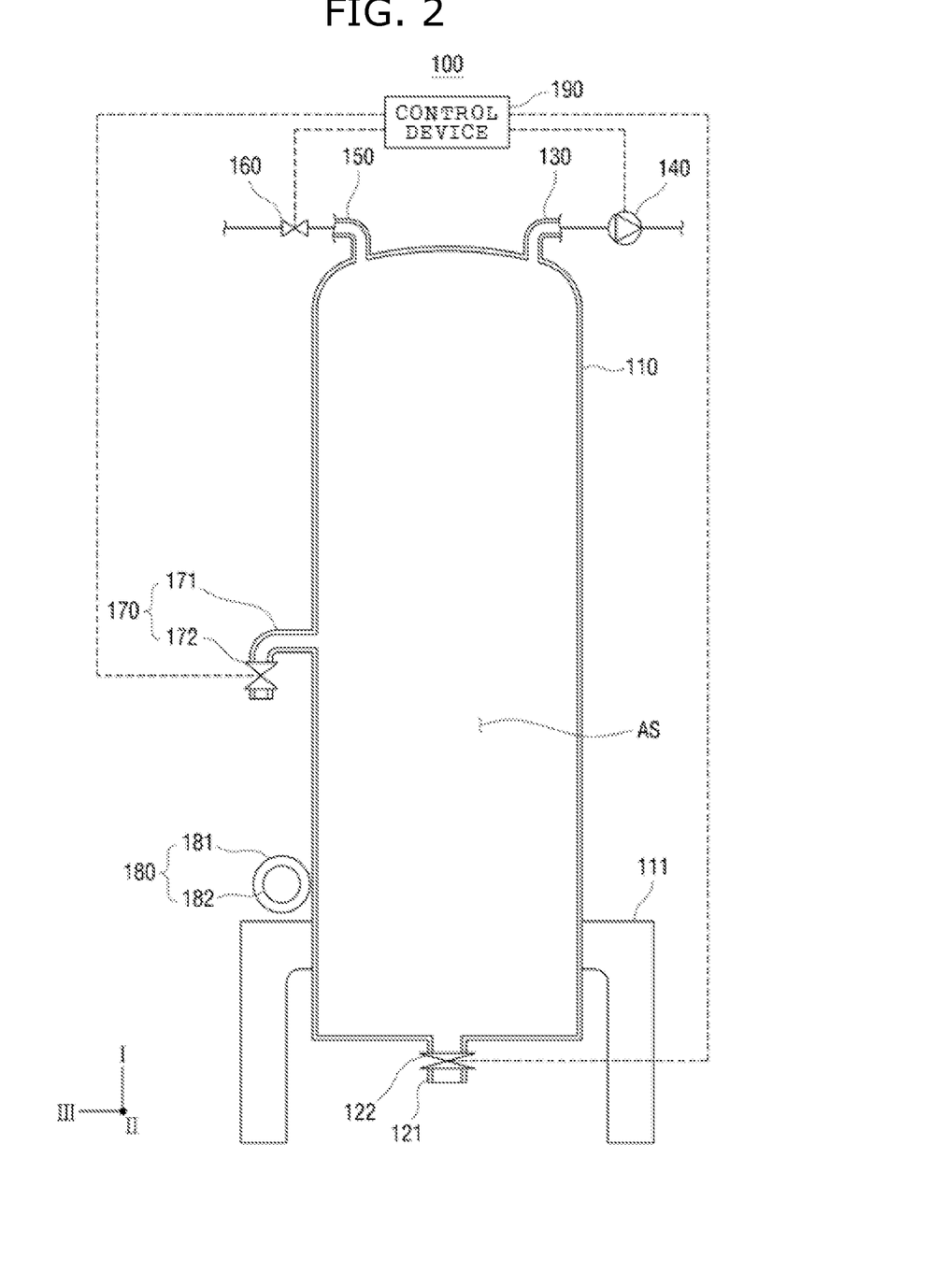

FIGS. 1 and 2 are views showing a power generation apparatus according to an embodiment of the present invention.

Referring to FIGS. 1 and 2, a power generation apparatus 100 includes a chamber 110, a support part 111, an intake pipe 121, an intake valve 122, a discharge pipe 130, a pressure pump 140, an inlet pipe 150, an inlet valve 160, a spray unit 170, a power generation unit 180, and a control device 190.

The chamber 110 serves to accommodate water. To this end, the chamber 110 may include an accommodation space AS for accommodating water. The intake pipe 121 may be provided on the bottom surface of the chamber 110. The intake pipe 121 may provide a path for the water that is introduced into the accommodation space AS of the chamber 110. The sectional area of the bottom surface of the chamber 110 may be larger than the sectional area of the intake pipe 121. The chamber 110 may accommodate water introduced through the intake pipe 121.

The chamber 110 may be fixed to the ground by the support part 111. In the present invention, the ground may be understood as the top surface of the ground supporting river water or stream water at a point where the river water or the stream water is located. As a result, in the present invention, the chamber 110 is installed at a point where river water or stream water is located, and generates electric power. Hereinafter, a point where river water or stream water is located and electric power is generated by the power generation apparatus 100 of the present invention is referred to as a power generation point.

The chamber 110 may have a shape long in a direction perpendicular to the ground. Hereinafter, the direction perpendicular to the ground is referred to as a first direction I, the direction perpendicular to the first direction I and parallel to the ground is referred to as a second direction II, and the direction perpendicular to the first direction I and the second direction II is referred to as a third direction III.

Alternatively, according to some embodiments of the present invention, the chamber 110 may have a wide shape parallel to the ground. In other words, in the external shape of the chamber 110, the sizes in the second direction II and the third direction III are longer than the size in the first direction I. The following description will be given with a focus on the chamber 110 having a shape long in the first direction I.

Although FIG. 1 shows the chamber 110 having a cylindrical shape long in the first direction I, the shape of the chamber 110 of the present invention is not limited to a cylindrical shape, but may be a polygonal pillar such as a square pillar. The following description will be given with a focus on a case where the chamber 110 has a cylindrical shape.

The discharge pipe 130 may be provided on the ceiling surface of the chamber 110. The discharge pipe 130 may provide a path through which the air accommodated in the accommodation space AS of the chamber 110 is discharged to the outside. The sectional area of the ceiling surface of the chamber 110 may be larger than the sectional area of the discharge pipe 130. The pressure pump 140 may be connected to one end of the discharge pipe 130. The pressure pump 140 serves to generate pressure and discharge the air in the accommodation space AS out of the chamber 110 through the discharge pipe 130 provided on the ceiling surface of the chamber 110. More specifically, the air present in the upper space of the accommodation space AS may be discharged out of the chamber 110 through the discharge pipe 130 by the pressure of the pressure pump 140.

As the air present in the upper space of the accommodation space AS is discharged out of the chamber 110 by the pressure pump 140, water may be introduced into the chamber 110 through the intake pipe 121. When the chamber 110 is installed at the power generation point, the intake pipe 121 may be located below the surface of the water. In other words, a portion of the lower portion of the chamber 110 may be submerged in water. Accordingly, in the case where the air present in the upper space of the accommodation space AS is discharged out of the chamber 110 by the pressure pump 140, as the internal pressure of the chamber 110 is reduced compared to the external pressure based on the intake pipe 121, water may be introduced into the chamber 110 through the intake pipe 121, and may rise up to the top surface of the chamber 110.

The intake pipe 121 may be provided with the intake valve 122. The intake valve 122 may open or close the intake pipe 121. When the intake valve 122 opens the intake pipe 121, water may be introduced into the chamber 110 through the intake pipe 121. When the intake valve 122 closes the intake pipe 121, the movement of water through the intake pipe 121 may be blocked.

The spray unit 170 is provided on a side of the chamber 110, and serves to spray the water, introduced by the pressure pump 140 and accommodated in the accommodation space AS, out of the chamber 110.

The spray unit 170 is configured to include a spray pipe 171 and a spray adjustment part 172. The spray unit 171 may provide a path for the water sprayed out of the chamber 110. One side of the spray unit 171 may be connected to the side of the chamber 110. Accordingly, the spray pipe 171 may provide a path for the water discharged from the side of the chamber 110 and connected to the power generation unit 180.

The spray adjustment part 172 serves to adjust the amount of water sprayed by the spray pipe 171. The spray adjustment part 172 closes the spray pipe 171 so that water is not sprayed, partially opens the spray pipe 171 so that a small amount of water is sprayed, or completely opens the spray pipe 171 so that a large amount of water is sprayed.

A spray hole through which water is sprayed from the spray pipe 171 may face the ground. Accordingly, the water sprayed from the spray unit 170 may fall through a connection pipe (not shown) connected to the power generation unit 180, or may fall directly from the spray unit 170 toward the ground.

The power generation unit 180 serves to generate power by the pressure of water sprayed by the spray unit 170. The power generation unit 180 is configured to include a rotation part 181 and a power generation part 182. The rotation part 181 may be rotated by the force of the water sprayed by the spray unit 170. In order to receive the force of water, the rotation part 181 may be provided with a plurality of blades. As water exerts impact on one surface of each of the blades, the rotation part 181 may be rotated. In particular, in the present invention, the spray unit 170 may be provided above the rotation part 181. The rotation part 181 may be rotated by the force of water falling from the spray unit 170.

The power generation part 182 serves to convert the rotational force of the rotation part 181 into electric power. A rotation shaft 183 may be provided between the rotation part 181 and the power generation part 182 in order to transmit the rotational force of the rotation part 181 to the power generation part 182.

A part of the rotation shaft 183 may be accommodated in the power generation part 182. A coil (not shown) is wound around the rotation shaft 183 accommodated inside the power generation part 182, and a permanent magnet (not shown) may be provided inside the power generation part 182 along the edge of the coil. When the rotation shaft 183 is rotated, a current may flow through the coil. Since the detailed internal structure of the power generation part 182 is out of the scope of the present invention, a detailed description will be omitted.

The electric power produced by the power generation part 182 may be transferred to and consumed by a power consumer (not shown).

The inlet pipe 150 may be provided on the ceiling surface of the chamber 110. The inlet pipe 150 may provide a path for the external air introduced into the accommodation space AS of the chamber 110. The inlet valve 160 may be provided in the inlet pipe 150. The inlet valve 160 may selectively open and close the inlet pipe 150. When the inlet valve 160 opens the inlet pipe 150, external air may be introduced into the chamber 110 through the inlet pipe 150. When the inlet valve 160 closes the inlet pipe 150, the inflow of external air through the inlet pipe 150 may be blocked.

The inlet pipe 150 serves to more smoothly spray water through the spray unit 170. When the distance between the water surface of the water present around the chamber 110 at the power generation point and the surface of water accommodated in the accommodation space AS of the chamber 110 is not sufficiently large (for example, when the distance is less than 10 m), water may not be sprayed smoothly through the spray hole even when the spray hole is opened. The pressure inside the chamber 110 and the pressure outside the chamber 110 are formed to be similar to each other, so that water may not be discharged smoothly through the spray hole.

When the inlet pipe 150 is opened and external air is introduced into the chamber 110, the internal pressure is formed to be larger than that outside the chamber 110, so that water may be discharged smoothly through the spray hole.

The control device 190 serves to control the intake valve 122, the pressure pump 140, the inlet valve 160, and the spray adjustment part 172 according to input control commands. For example, when a control command to accommodate water in the chamber 110 is input, the control device 190 may control the intake valve 122 to open the intake pipe 121, may operate the pressure pump 140, may control the inlet valve 160 to close the inlet pipe 150, and may control the spray adjustment part 172 to close the spray pipe 171. In addition, when a control command to generate power is input, the control device 190 may control the intake valve 122 to close the intake pipe 121, may stop the operation of the pressure pump 140, may control the inlet pipe 150 to open the inlet valve 160, and may control the spray adjustment part 172 to open the spray pipe 171.

Furthermore, the control device 190 may perform a cross command for a control command to accommodate water and a control command to generate power.

The control device 190 may be disposed adjacent to the chamber 110, or may be disposed remote from the chamber 110. A user may input a control command to the control device 190. The control device 190 may control the intake valve 122, the pressure pump 140, the inlet valve 160, and the spray adjustment part 172 according to control commands input from a user. In this case, a user may input a detailed control command for the spray adjustment part 172. For example, a user may input an adjustment command specifying the degree of opening of the spray pipe 171, and the control device 190 may provide the spray adjustment part 172 so that the spray pipe 171 may be opened according to the input adjustment command.

Figure 3:
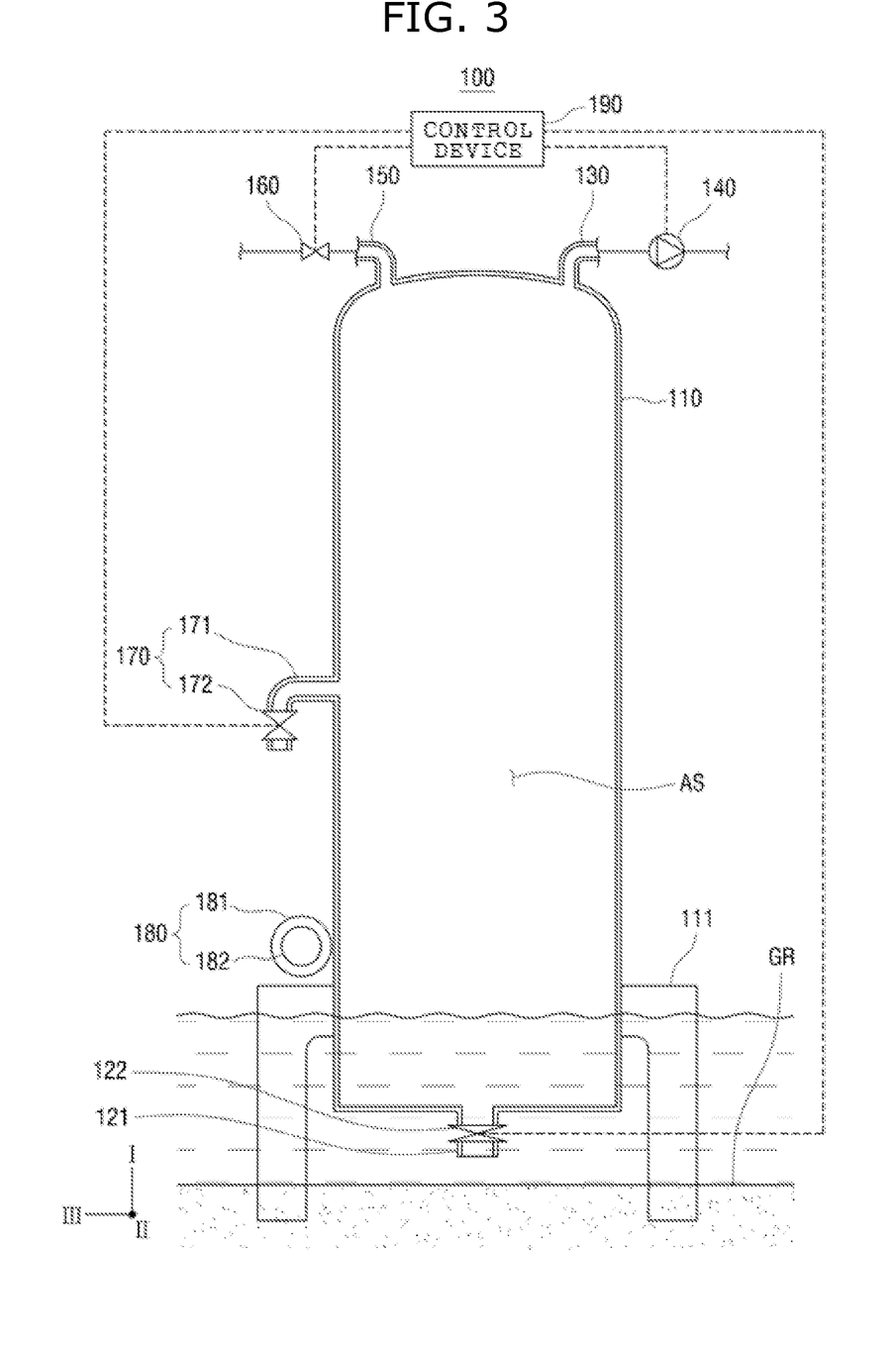
FIG. 3 is a view showing a state in which the power generation apparatus according to the embodiment of the present invention is installed at a power generation point.

FIG. 3 is a view showing a state in which the power generation apparatus according to the embodiment of the present invention is installed at a power generation point.

Referring to FIG. 3, a power generation apparatus 100 may be installed at a power generation point. As the support part 111 of the power generation apparatus 100 penetrates the ground GR, the power generation apparatus 100 may be firmly fixed to the power generation point. In addition, the bottom of the chamber 110 may be maintained in a state of being spaced apart from the ground GR by a predetermined distance by the support part 111. Accordingly, the introduction of water through the intake pipe 121 may be easily performed.

Water may be present on the top of the ground GR. The position of the chamber 110 may be determined such that the provided intake pipe 121 is immersed in water. In addition, the posture of the chamber 110 may be determined such that the long axis thereof is perpendicular to the ground, i.e., parallel to the first direction I.

Figure 4:
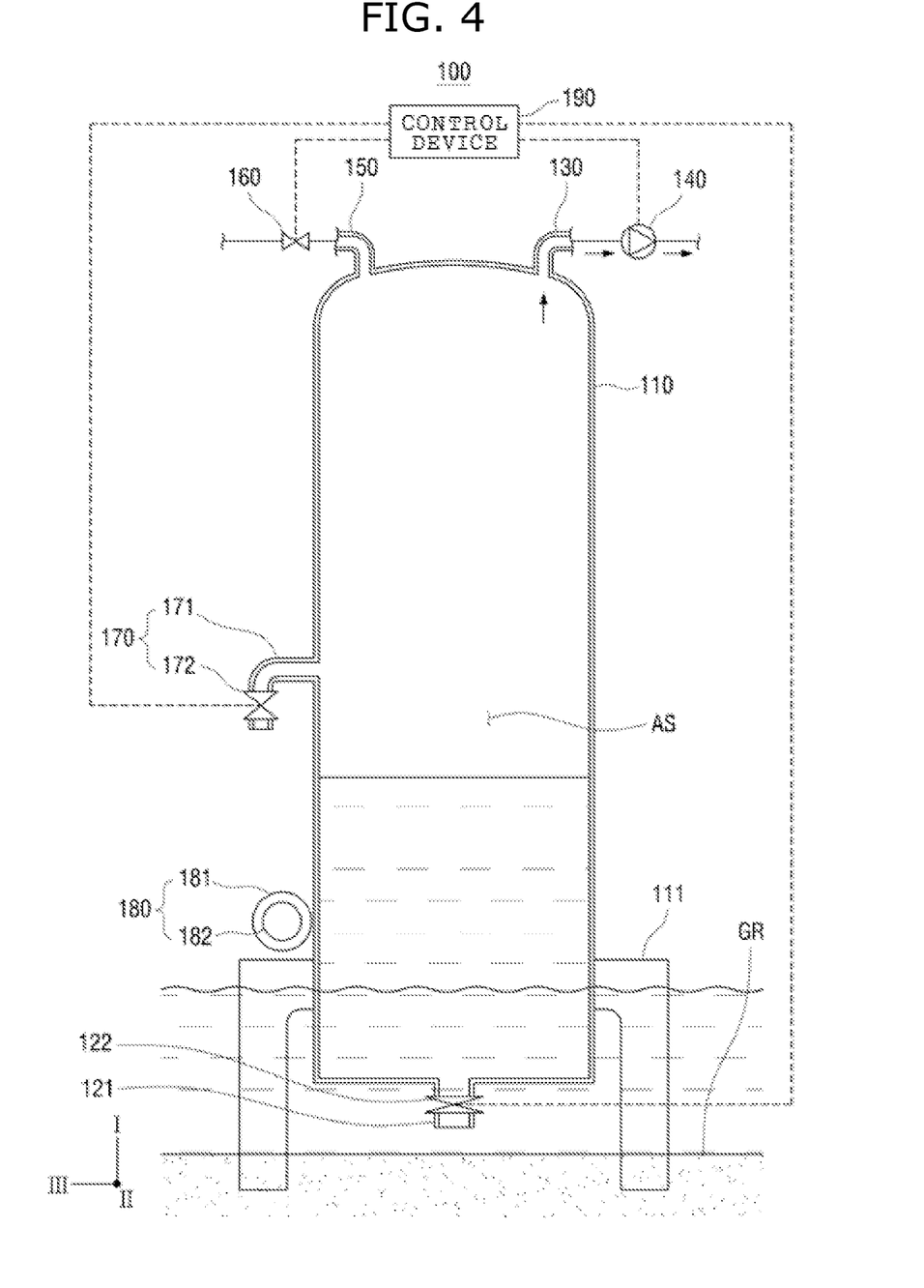
FIG. 4 is a view showing a state in which water is introduced into the chamber according to the embodiment of the present invention.
Figure 5:
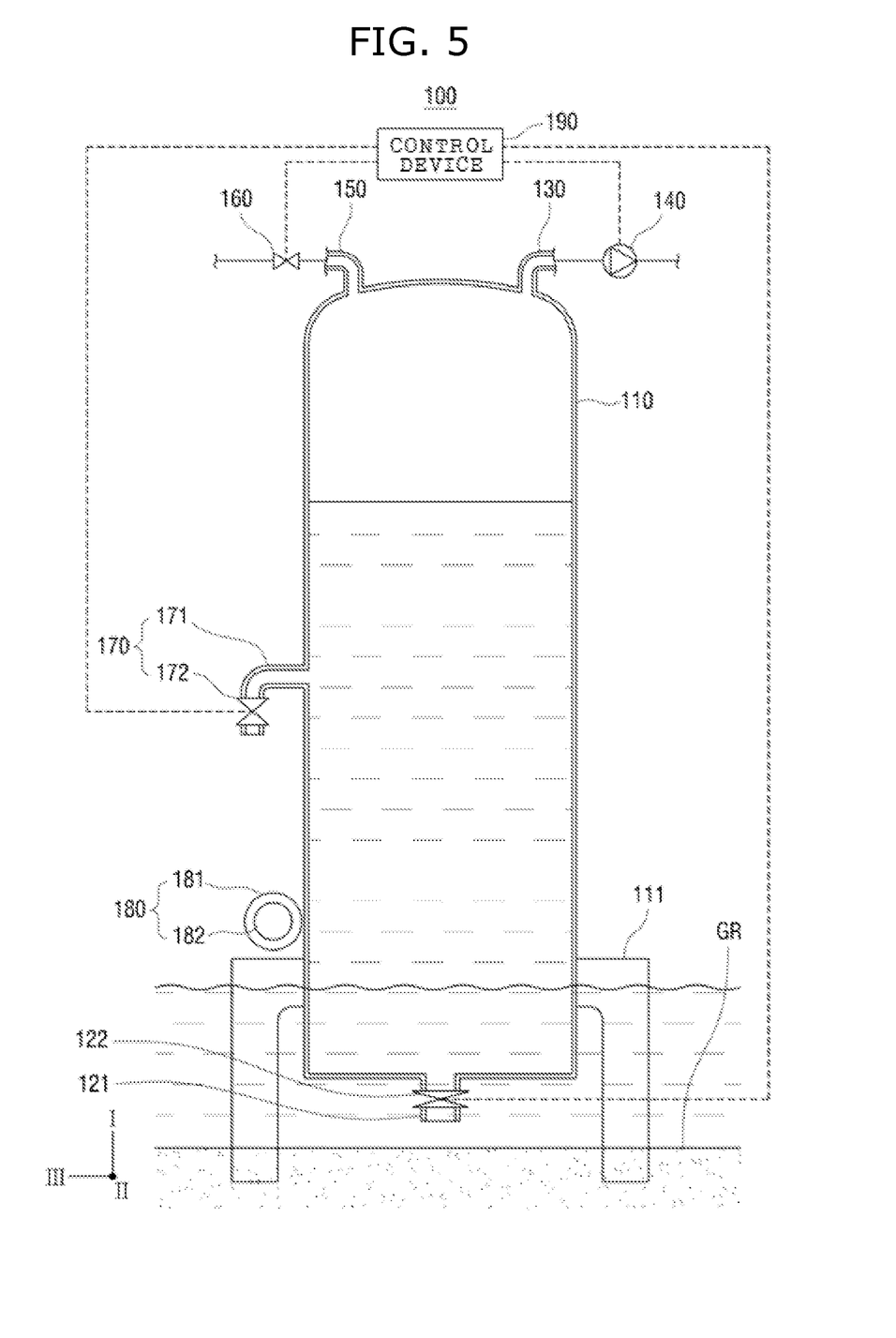
FIG. 5 is a view showing a state in which water is accommodated in the chamber according to the embodiment of the present invention.

FIG. 4 is a view showing a state in which water is introduced into the chamber according to the embodiment of the present invention, and FIG. 5 is a view showing a state in which water is accommodated in the chamber according to the embodiment of the present invention.

Referring to FIG. 4, water may be introduced into the accommodation space AS through the intake pipe 121 of the chamber 110.

As the pressure pump 140 is operated, the air present in the upper portion of the accommodation space AS may be discharged through the discharge pipe 130. Accordingly, the internal pressure of the accommodation space AS becomes lower than external pressure, and thus the introduction of water through the intake pipe 121 may be performed by a decompression action attributable to the pressure difference. In this case, the intake valve 122 may open the intake pipe 121.

In this case, the introduction force of water attributable to the decompression action increases in proportion to the pressure of the pressure pump, in proportion to the magnification of the sectional area of the ceiling surface of the chamber 110 with respect to the sectional area of the discharge pipe 130, and in proportion to the magnification of the sectional area of the bottom surface of the chamber 110 with respect to the sectional area of the intake pipe 121 because the pressure and the horizontal spatial distance to the pressure increase. To this end, the accommodation space of the chamber 110 may be formed such that the magnification of the sectional area is high.

The introduction of water may be performed until the surface of the water of the accommodation space AS reaches a predetermined distance from the top surface of the chamber 110. To this end, a sensing means (not shown) for detecting the surface of the water may be provided. The control device 190 may control the pressure pump 140 by referring to the detection result of the sensing means.

Referring to FIG. 5, the chamber 110 may maintain a state in which water is accommodated. To this end, the intake valve 122 may close the intake pipe 121, the operation of the pressure pump 140 may be stopped, the inlet valve 160 may close the inlet pipe 150, and the spray adjustment part 172 may close the spray pipe 171.

Figure 6:
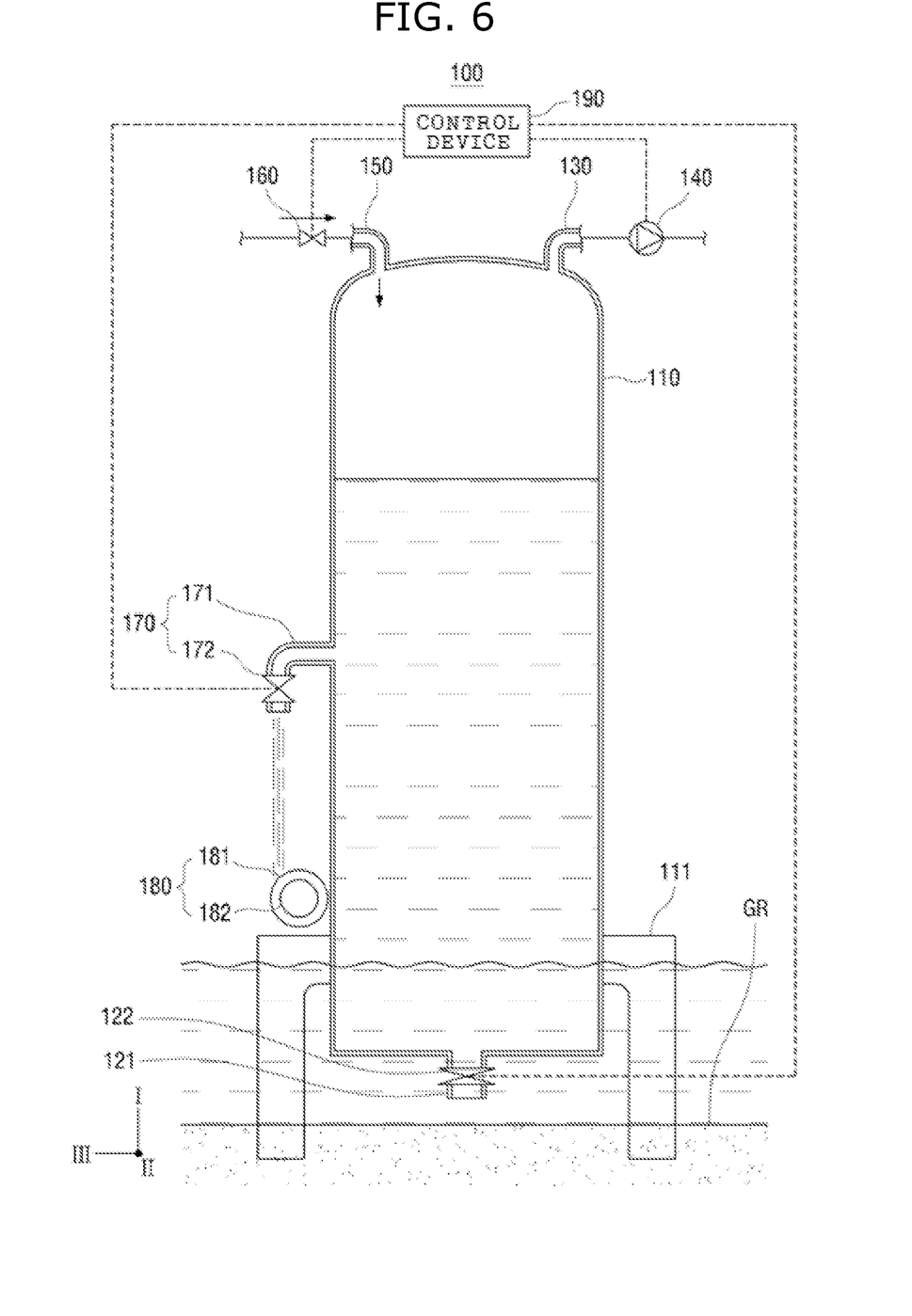
FIG. 6 is a view showing a state in which power is generated by the power generation apparatus according to the embodiment of the present invention.

FIG. 6 is a view showing a state in which power is generated by the power generation apparatus according to the embodiment of the present invention.

Referring to FIG. 6, the power generation apparatus 100 may generate electric power. In order to generate power, the control device 190 may control the intake valve 122, the inlet valve 160, and the spray adjustment portion 172. The inlet valve 160 may open the inlet pipe 150, and the spray adjustment part 172 may open the spray pipe 171. In this case, the intake valve 122 may close the intake pipe 121 in order to prevent water from flowing out through the intake pipe 121.

The water sprayed from the spray pipe 171 may fall and reach the rotation part 181 of the power generating unit 180. The rotation part 181 is rotated by the falling water, and the rotational force of the rotation part 181 may be transmitted to the power generating part 182. The power generation part 182 may convert the transmitted rotational force into electric power. The amount of power generated by the power generation part 182 may vary depending on the degree of opening of the spray pipe 171 by the spray adjustment part 172.

In the case where a plurality of apparatuses are installed, when the pressure pump is operated and water is accommodated in the chamber, power generation by the power generation unit may be continuously performed, so that enough power may be supplied to consumers who lack power. It may be understood as using a type of leverage principle to continuously supply enough power to a demander that lacks power, as in the above-described apparatus.

A lever is composed of a rod and a fulcrum, and the fulcrum may support the rod disposed substantially parallel to the ground. In this case, in order for the rod to remain parallel to the ground, the weights of objects placed on both sides of the rod need to be appropriately determined according to the position of the fulcrum that supports the rod.

An object close to the fulcrum needs to be replaced by a heavier mass than an object far from the fulcrum. When the rod is parallel to the ground, this means that the forces acting on both sides (hereinafter referred to as ends A and B) of the rod are the same. In a balanced state, neither A nor B exhibits any motion. In contrast, for example, when the object at the end A is removed or becomes close to the fulcrum, the end B is lowered with a force corresponding to the mass of the object placed thereon or the reduced horizontal spatial distance. In the above description, in the case where the objects at the ends A and B and the rod are connected containers for accommodating water, when the rod is fixed parallel and the more water in the container at one point close to the fulcrum and the less water in the container at the other point are discharged to the rod having a pipe shape filled with water, the water at the other point rises. This means that as the horizontal spatial distance or the difference in mass between one side and the other side to which the corresponding forces of the lever are applied increases, the high decompression force on the lever is applied, and the situation in which the bar is parallel or moved up and down by the decompression force is replaced by the situation in which the water in the containers is parallel or moved up and down. In this case, the spatial distance on the lever is an enclosed relative spatial distance, and may be referred to as a type of enclosed space. It can be seen that when the horizontal space on the lever increases, the decompression space attributable to the structure of the lever increases, thereby increasing the spatial power.

According to the force action based on the above leverage principle, when the horizontal spatial distance increases, the force of the weight is lightened by decompression by the increased distance, and the force attributable to the spatial expansion increases. Accordingly, there are exhibited two energy synergistic effects such as the force of the weight divisor effect and the force of the space multiplier effect.

As described above, the reason why the water in the container at one point close to the fulcrum rises above the water in the container at the other point in the state of the balance of forces is that the spatial distance at which the water in the container at the other point is located is large.

In this case, when a fluid such as water expands the decompression space in a fixed enclosed three-dimensional space such as a chamber, a spatial force attributable to a decompression factor is generated, so that the potential energy of water increases. It can be seen that it may be possible to increase the energy of a fluid such as water by adjusting the decompression space in the same way as the force action by the lever principle.

In the above description, the power generation apparatus of the present invention may be implemented by expanding the movement of the two-dimensional lever based on area to a three-dimensional lever based on space. In other words, the power generation apparatus according to the embodiment of the present invention may once introduce water into the chamber and maintain the balance of forces between the inside and outside of the chamber. There is no increase or decrease in energy when the balance is maintained. This means that the balance action of the chamber space in a state in which water has been introduced is balanced by the spatial force of the decompression space by the decompression factor. In this state, it can be seen that an increase or decrease in energy occurs when a spatial adjustment force such as a lever action is performed. In the case where the upper pressure pump is operated, as the size of the overall space of the chamber increases and the size of the gas space inside the chamber increases, the generation of spatial force attributable to the decompression factor increases in the chamber. Due to the decompression action caused by the operation of the pressure pump, the force of the weight of water inside the chamber becomes lighter than that outside it, and the force raising the weight of the water becomes larger, thereby generating a spatial adjustment force that generates a power magnification such as a lever action.

Both the fixed rod lever and the three-dimensional lever described above are based on a common principle that spatial force is increased due to the decompression action caused by the adjustment of the horizontal enclosed space.

This may be understood as the three-dimensional expansion of the operation of the force of the end B by adjusting the space as the above-described object at the end A is removed or becomes close to the fulcrum. As described above, the power generation apparatus of the present invention may efficiently collect and store the potential energy of a fluid and convert it into electric power by using the spatial expanded principle of leverage that is extended three-dimensionally.

The power generation apparatus that technically utilizes the principle of leverage is intended to generate energy by using fluid spaces such as water and air according to the high-dimensional principle of three-dimensional leverage. It may be viewed as a spatial technological energy generation apparatus that may generate enough eco-friendly alternative energy as electric power.

Figure 7:
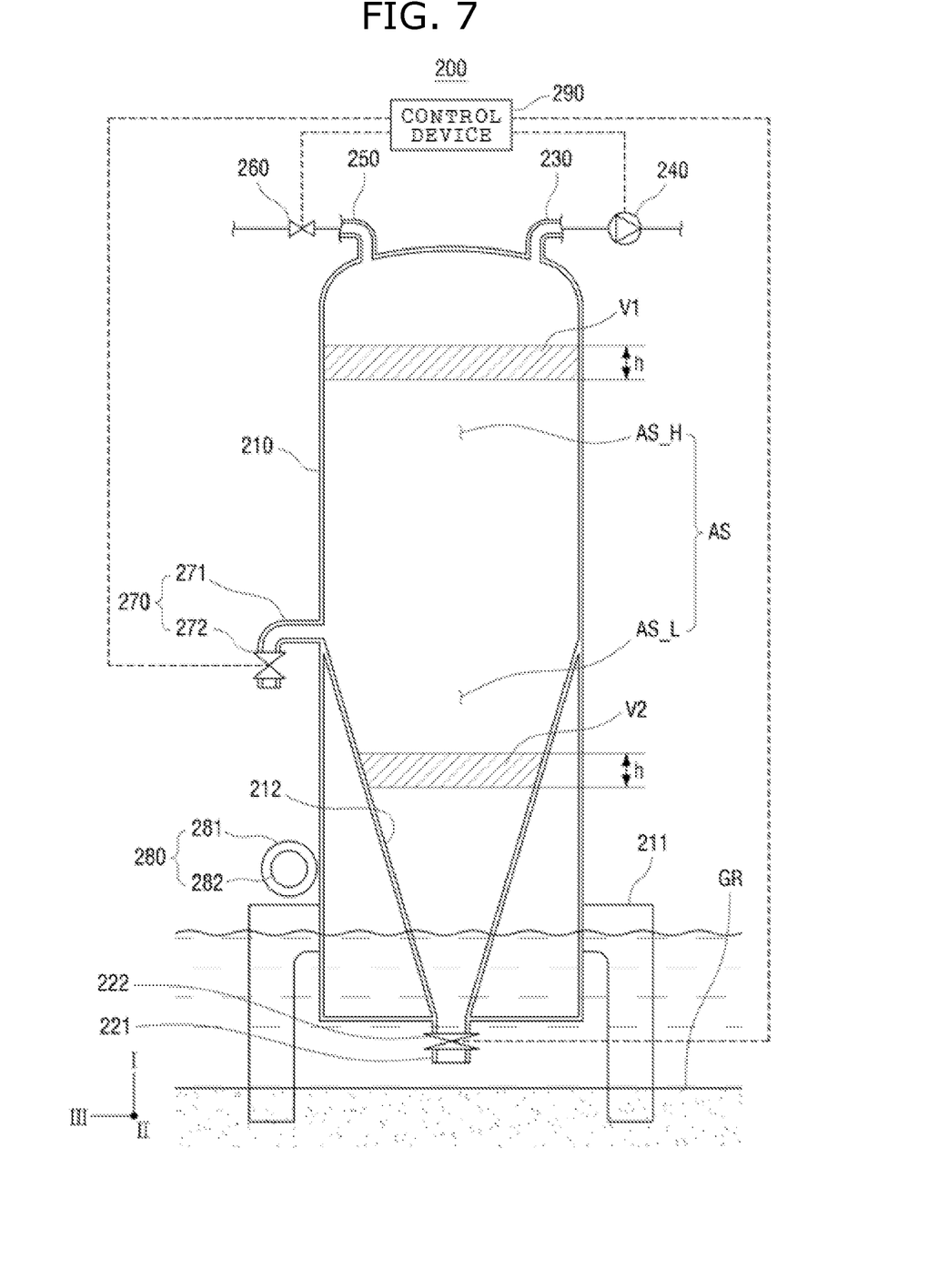
FIGS. 7 to 9 are views showing power generation apparatuses according to other embodiments of the present invention.
Figure 8:
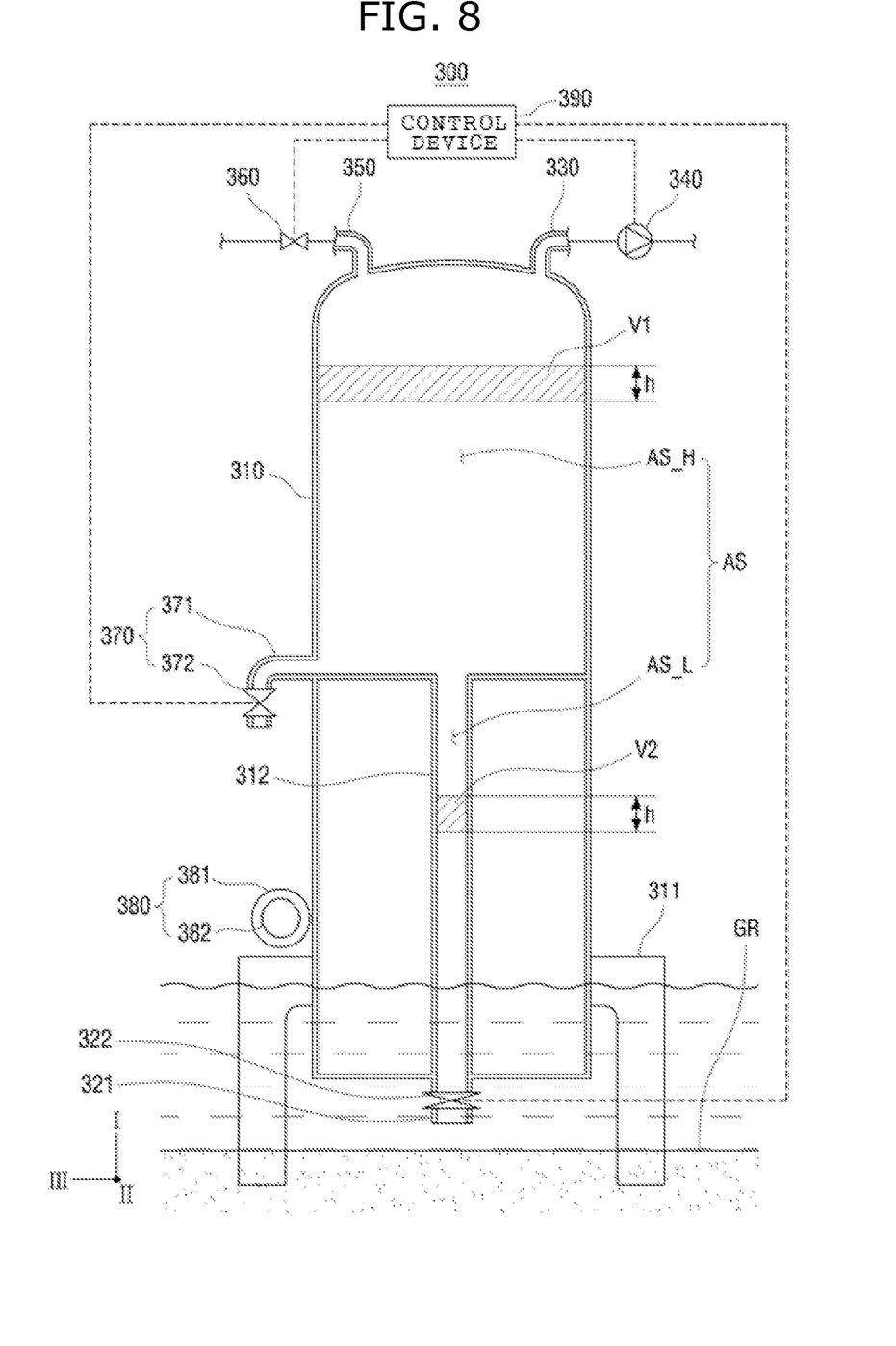
Figure 9:
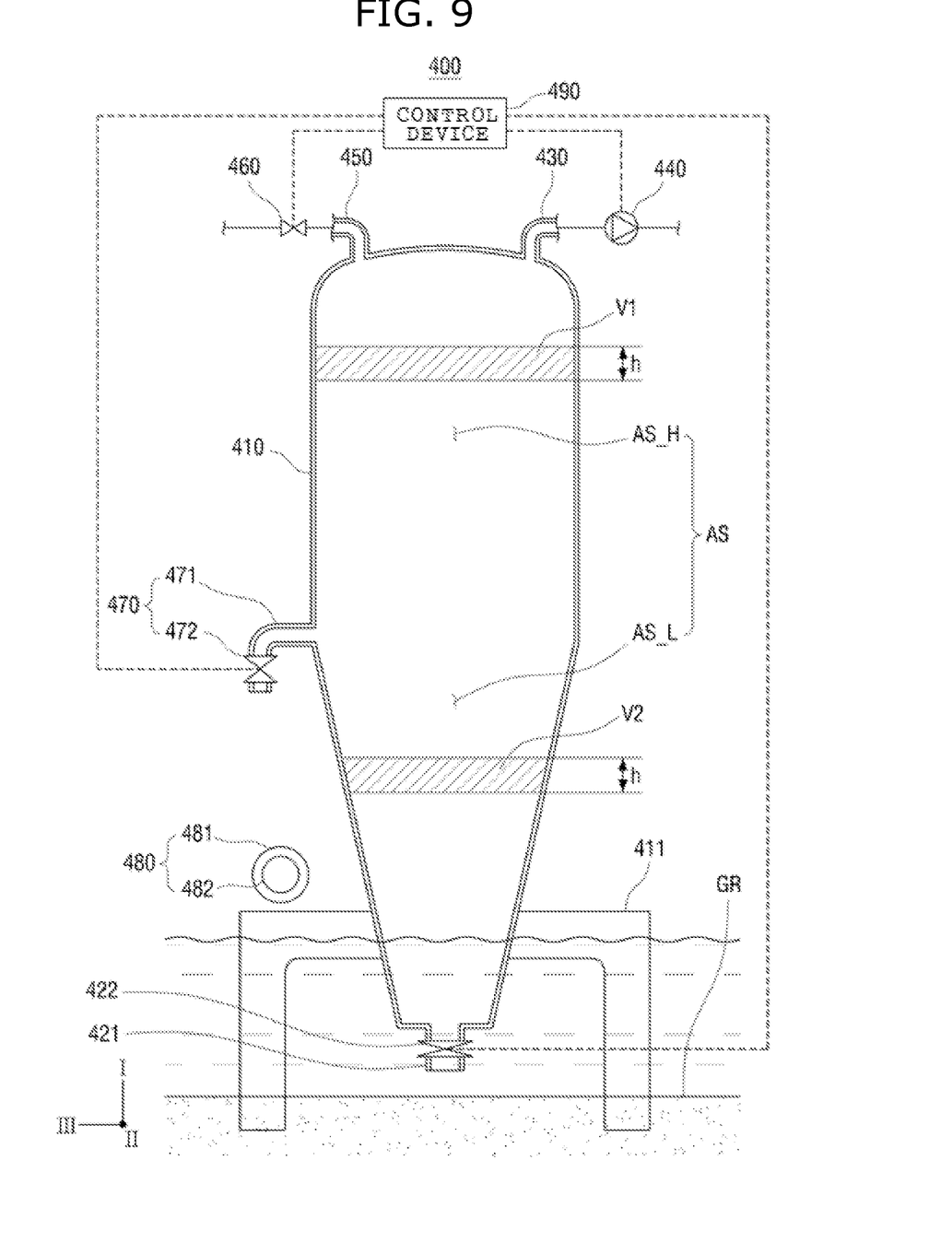

FIGS. 7 to 9 are views showing power generation apparatuses according to other embodiments of the present invention.

Referring to FIGS. 7 to 9, power generation apparatuses 200, 300, and 400 each include a chamber 210, 310, or 410, a support part 211, 311, or 411, an intake pipe 221, 321, or 421, an intake valve 222, 322, or 422, a discharge pipe 230, 330, or 430, a pressure pump 240, 340, or 440, an inlet pipe 250, 350, or 450, an inlet valve 260, 360, or 460, a spray unit 270, 370, or 470, a power generation unit 280, 380, or 480, and a control device 290, 390, or 490.

The chamber 210, 310, or 410 may be fixed to the ground GR by the support part 211, 311, or 411. In addition, the spray unit 270, 370, or 470 may include a spray pipe 271, 371, or 471 and a spray adjustment part 272, 372, or 472, and the power generation unit 280, 380, or 480 may include a rotation part 281, 381, or 481 and a power generation part 282, 382, or 482. Since the shapes and functions of the chamber 210, 310, or 410, the support part 211, 311, or 411, the suction pipe 221, 321, or 421, the intake valve 222, 322, or 422, the discharge pipe 230, 330, or 430, the pressure pump 240, 340, or 440, the inlet pipe 250, 350, or 450, the inlet valves 260, 360, or 460, the spray unit 270, 370, or 470, the power generation unit 280, 380, or 480, and the control device 290, 390, or 490 are similar to the shapes and functions of the above-described chamber 110, support part 111, intake pipe 121, intake valve 122, discharge pipe 130, pressure pump 140, inlet pipe 150, inlet valve 160, spray unit 170, power generation unit 180, and control device 190, the following description will be given with a focus on the differences therebetween.

The accommodation space AS of the chamber 210, 310, or 410 may include an upper space AS_H and a lower space AS_L. The upper space AS_H represents a space formed in the upper side of the accommodation space AS based on the height of each of the spray units 270, 370, and 470, and the lower space AS_L represents a space formed under the accommodation space AS based on the height of the spray unit 270, 370, or 470. In particular, the upper space AS_H may include a space corresponding to the height of the spray unit 270, 370, or 470. For example, the water contained in the upper space AS_H may be sprayed through the spray unit 270, 370, or 470, but the water contained in the lower space AS_L may not be sprayed through the spray unit 270, 370, or 470.

The volume V1 of the upper space AS_H per unit height h may be formed to be larger than the volume V2 of the lower space AS_L per unit height h. More specifically, the lower space AS_L is connected to the intake pipe 221, 321, or 421. The lower space AS_L may have a sectional area increasing in an upward direction from the intake pipe 221 or 421, as shown in FIGS. 7 and 9, or may have the same sectional area as the intake pipe 321, as shown in FIG. 8. In order for the volume V1 of the upper space AS_H per unit height h to be formed to be larger than the volume V2 of the lower space AS_L per unit height h, an inner plate 212 or 312 is provided inside the chamber 210 or 310, as shown in FIGS. 7 and 8, or the sectional area of the outer plate of the chamber 410 forming the lower space AS_L may be formed to be smaller than that of the outer plate of the chamber 410 forming the upper space AS_H, as shown in FIG. 9. As described above, the spray unit 270, 370, or 470 may spray only water contained in the upper space AS_H. In other words, the water accommodated in the lower space AS_L may not be sprayed by the spraying unit 270, 370, or 470. Since only the water accommodated in the upper space AS_H is used for the generation of power, unnecessary energy used to introduce water into the lower space AS_L may be wasted in one respect. As shown in FIGS. 7 to 9, it may be possible to reduce unnecessary waste of energy by reducing the amount of water accommodated in the lower space AS_L.

Meanwhile, when the water collected in the above embodiment is stored in parallel by expanding the upper space facility, possible power generation capacity may be increased, and a spatial, technological energy power plant that can replace a thermal power plant, a hydropower plant, or a nuclear power plant may be installed.

Although the embodiments of the present invention have been described with reference to the accompanying drawings above, it will be understood by those of ordinary skill in the art to which the present invention pertains that the present invention may be implemented in other specific forms without changing the technical spirit or essential features of the present invention. Therefore, it should be understood that the embodiments described above are illustrative and not limitative in all respects.

The invention claimed is:

1. A power generation apparatus comprising:
   a chamber having an accommodation space for accommodating water, and configured to accommodate water introduced through an intake pipe disposed on a bottom surface thereof;
   a pressure pump configured to generate pressure to discharge air in the accommodation space out of the chamber through a discharge pipe provided on a ceiling surface of the chamber, wherein water is introduced into the chamber through the intake pipe as air in the accommodation space is discharged out of the chamber by the pressure pump;
   a spray unit provided on an outer side surface of the chamber, and configured to spray water, introduced by the pressure pump and accommodated in the accommodation space, out of the chamber; and
   a power generation unit configured to generate power using a pressure of water sprayed by the spray unit.

2. The power generation apparatus of claim 1, wherein:
   the chamber has a shape long in a direction perpendicular to a ground or a wide shape parallel to the ground;
   a sectional area of the ceiling surface is formed to be larger than a sectional area of the discharge pipe; and
   a sectional area of the bottom surface is formed to be larger than a sectional area of the intake pipe.

3. The power generation apparatus of claim 1, further comprising:
   an inlet pipe provided on the ceiling surface of the chamber, and configured to provide a path for external air introduced into the accommodation space;
   an inlet valve configured to selectively open and close the inlet pipe; and
   an intake valve configured to selectively open and close the intake pipe.

4. The power generation apparatus of claim 3, further comprising a control device configured to control the pressure pump, the spray unit, the inlet valve, and the intake valve.

5. The power generation apparatus of claim 1, wherein the power generation unit comprises:
- a rotation part configured to be rotated by a force of water sprayed by the spray unit; and
- a power generation part configured to convert a rotational force of the rotation part into electric power.

6. The power generation apparatus of claim 5, wherein:
the spray unit is provided above the rotation part; and
the rotation part is rotated by a force of water falling from the spray unit.

7. The power generation apparatus of claim 1, wherein:
the accommodation space comprises:
an upper space formed in an upper side of the accommodation space based on a height of the spray unit; and
a lower space formed in a lower side of the accommodation space based on the height of the spray unit;
the upper space comprises a space corresponding to the height of the spray unit;
the lower space is connected to the intake pipe; and
a volume of the upper space per unit height is formed to be larger than a volume of the lower space per unit height.

8. The power generation apparatus of claim 7, wherein the lower space has a sectional area increasing in an upward direction from the intake pipe, or has a same sectional area as the intake pipe.

* * * * *